Figure 1:
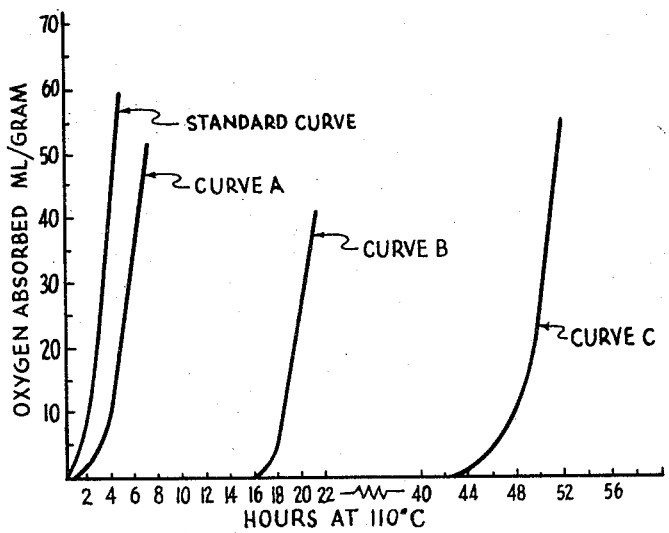
Figure 2:
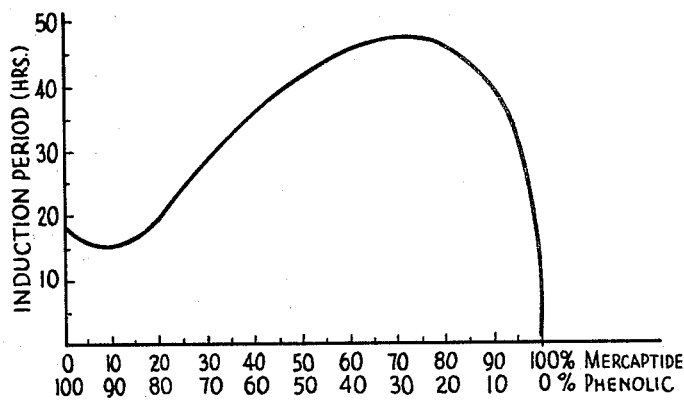

Dec. 1, 1964    W. H. MEEK, JR    3,159,599
ANTI-OXIDANT STABILIZER
Filed March 14, 1960

WILLIAM H. MEEK JR. *INVENTOR.*

*BY*

*Robert J. Blanke Atty.*

3,159,599
ANTI-OXIDANT STABILIZER
William H. Meek, Jr., Euclid, Ohio, assignor, by mesne assignments, to Ferro Corporation, Cleveland, Ohio, a corporation of Ohio
Filed Mar. 14, 1960, Ser. No. 14,943
2 Claims. (Cl. 260—45.75)

This invention relates to new compositions of matter suitable for use as anti-oxidants and to resinous compositions containing the new anti-oxidants. The resins with which this invention is concerned are saturated hydrocarbon polymeric materials selected from the group consisting of polyethylene, polypropylene, polybutene-1,3-methylpentene-1, and copolymers thereof. Polymeric materials of this type, while having desirable dielectric and abrasion resistant properties, are subject to deterioration from heat which accelerates oxidation of the long chain polymeric structure.

There is abundant evidence that the oxidation is auto-catalytic involving a free radical chain process. The source of first radicals for initiation is a matter of speculation, possibly they are formed by homolytic dissociation of a C—H or C—C bond in the chain, or are formed from the decomposition of a peroxide according to the following reaction:

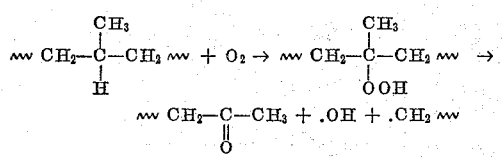

Retardation and even inhibition for a time of this type of thermal oxidation can be achieved by incorporation of certain anti-oxidant stabilizers.

It is possible to obtain better all around stabilization by using a combination of stabilizers rather than one single stabilizer. The effects of a plurality of stabilizers are quite often synergistic rather than merely additive in their stabilizing effects. One theory is that two or more stabilizers may supplement each other in a manner such that each is conserved and therefore perform over longer periods of time.

It is, therefore an object of this invention to prepare as a new composition of matter a synergistic anti-oxidant mixture.

It is another object of this invention to prepare polymeric resinous compositions containing new and novel synergistic anti-oxidant mixtures.

The synergistic anti-oxidant mixture of this invention is a two-component mixture containing as a first component a phenolic compound having the following formula:

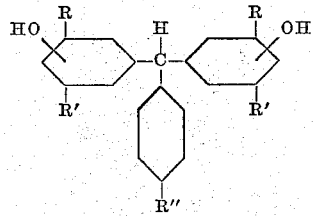

wherein R and R' are alkyl radicals independently selected from the group consisting of straight and branch chain alkyl radicals having from 1 to 8 carbon atoms and R'' is a member selected from the group consisting of hydrogen, alkyl members having from 1 to 8 carbon atoms, and alkoxy members having from 1 to 8 carbon atoms, and as a second stabilizing component a mercaptide compound having the formula

wherein M is a metal selected from the group consisting of cadmium and zinc, and wherein R is an alkyl radical containing from 5 to 20 carbon atoms. The preferred alkyl radicals are radicals selected from the group consisting of: n-amyl, isoamyl, n-hexyl, n-octyl, 2-ethyl hexyl, n-nonyl, 3,5,5-trimethyl hexyl, n-decyl, n-dodecyl, n-tetradecyl, n-hexadecyl, n-octadecyl, n-eicosyl.

Any combination of members selected from the aforementioned phenolic compounds and mercaptide compounds will yield an effective two-component synergistic anti-oxidation mixture. The preferred phenolic compounds, however, are phenolic compounds wherein the hydroxy radicals are in the para position and the preferred mercaptide compounds are cadmium mercaptides and more particularly cadmium dilauryl dimercaptide.

While the exact mechanism of the reaction which anti-oxidants produce in olefinic resins is unknown, there are two accepted reaction theories. It is believed that the anti-oxidant serves either to prevent the dissociation of a C—H or C—C bond in which case the anti-oxidant is known as a chain stopper, or breaks down polymer destroying peroxide, in which case the anti-oxidant is known as a peroxide decomposer. Both theories are dependent on the mechanism of the change undergone by the peroxide which is present in the polymer. According to the peroxide decomposer theory, an oxygen atom is removed from the peroxide by the anti-oxidant. The chain stopper theory holds that the peroxide is neutralized by the addition of hydrogen from the anti-oxidant. Each component of the synergistic anti-oxidation mixture of this invention appears to behave in a manner which supports one of the theories. The mercaptide appears to behave as a peroxide decomposer while the phenolic compound appears to behave as a chain stopper. The result is that the mercaptide and the phenolic compound function as a synergistic pair, that is, the mercaptide decomposes peroxide so that there are fewer free radicals to react with the chain stopper phenolic compound and the phenolic compound reacts with free radicals so that there are fewer free radicals to form peroxide for the peroxide decomposer to work on. In essence both components of the synergistic mixture are conserved, thus extending their performance over longer periods of time.

The synergistic anti-oxidant mixtures were incorporated in various resinous compositions and more specifically saturated hydrocarbon polymeric materials selected from the group consisting of polyethylene, polypropylene, polybutene-1,3-methylpentene-1, and copolymers thereof. The synergistic anti-oxidant mixtures were incorporated in amounts of from 0.001% to 3.0% based on the weight of the polymeric material, and preferably 0.05% to 0.5% based on the weight of the polymeric material. The ratio of mercaptide component to phenolic component in the synergistic mixture is from 0.2 to 45 parts of mercaptide component per part of phenolic component, the preferred ratio being 2.3:1.

The ability of the synergistic anti-oxidation mixtures to retard degradation in olefinic resins was tested by the following method:

Test sheets of polypropylene compounds with the novel anti-oxidant of this invention were compression molded to a thickness of approximately 0.005" or less and 1" x 4" rectangles were cut from these sheets. The rectangular sample suspended from a glass hook was placed in a Pyrex glass tube together with a two gram lump of calcium oxide or other suitable absorbent. The reaction vessel, suspended in a Shelton-Goodrich aluminum heating block maintained at 230±0.5° F., was connected to a gas burette and exhaust-intake manifold by means of a three way stopcock. A mercury reservoir attached to the gas burette, which completed a closed system, provided the means of maintaining a constant oxygen pressure of 1 atmosphere and also of measuring the volume of oxygen uptake. The reaction vessel was successively exhausted and filled with oxygen of 99.5% purity to assure a complete oxygen environment. After allowing temperature equilibrium to be established after the final filling, the gas pressure was adjusted to 760 mm. of mercury by means of the movable reservoir and a zero reading was taken. Thereafter, the pressure was adjusted to 760 mm. of mercury at one-half hour intervals, at the same time recording the volume of oxygen absorbed. Each sample was run in duplicate along with a blank to adjust for variations in atmospheric pressure and burette temperatures.

The induction period, which was obtained by extrapolating the straight line portion of a plot of milliliters of oxygen absorbed per gram of polymer versus time to the time axis, was used as a measure of the effectiveness of the anti-oxidant. Generalized results obtained by a comparison of equal amounts of the synergistic anti-oxidant of the invention with equal amounts of anti-oxidants of the prior art are as follows.

| Anti-oxidant: | Induction period of polypropylene, hrs. |
|---|---|
| None | 2.0 |
| 0.05% bis(3.5 diisopropyl-4-hydroxy phenyl) phenyl methane | 16.0 |
| 0.05% cadmium dilauryl dimercaptide | 3.2 |
| 0.05% 7 parts cadmium diauryl dimercaptide plus 3 parts bis(3.5 diisopropyl-4-hydroxy phenyl) phenyl methane | 48.3 |

A better understanding of the anti-oxidant ability of the various components of the synergistic mixture and of the synergistic mixture itself can be obtained from a discussion of the figures.

FIGURE I represents various curves plotting polypropylene uptake against time. The curves are as follows: one curve corresponding to a sample containing no additives; one to a sample containing the phenolic anti-oxidant; one to a sample containing a mercaptide anti-oxidant, and one to a sample containing the novel synergistic anti-oxidant mixture.

FIGURE II is a curve plotting induction period in hours against varying ratios of components of the novel synergistic mixture. It should be noted that FIGURE II exhibits a well defined peak, thereby denoting the preferred ratio of components for the synergistic mixture.

The data necessary for plotting the curves set forth in FIGURE I is given in the following table designated as Table I:

*Table I*

[Ml. of oxygen absorbed per gram of polypropylene]

| Hours at 110° C. | Unstabilized Standard | 0.05% A | 0.05% B | 0.05%A+B, 30% B and 70% A |
|---|---|---|---|---|
| 2.0 | 6.7 | | | |
| 2.5 | 13.4 | | | |
| 3.0 | 22.5 | | | |
| 3.5 | 29.5 | 4.6 | | |
| 4.0 | 40.0 | 9.1 | | |
| 4.5 | 51.0 | 14.9 | | |
| 5.0 | 62.0 | 20.3 | | |
| 5.5 | | 26.3 | | |
| 6.0 | | 38.6 | | |
| 17.0 | | | 0.6 | |
| 17.5 | | | 1.6 | |
| 18.0 | | | 4.1 | |
| 18.5 | | | 7.6 | |
| 19.0 | | | 12.4 | |
| 19.5 | | | 17.2 | |
| 20.0 | | | 24.5 | |
| 20.5 | | | 30.9 | |
| 47.0 | | | | 6.4 |
| 48.0 | | | | 9.8 |
| 49.0 | | | | 15.5 |
| 50.0 | | | | 27.8 |
| 51.0 | | | | 38.3 |
| 52.0 | | | | 58.0 |

A represents cadmium dilauryl dimercaptide.
B represents bis(3,5-diisopropyl-4-hydroxy phenyl) phenyl methane.

It is readily apparent that the induction period of curve C, the curve representing the two component anti-oxidation mixture, shows synergism as compared with the cadmium dilauryl dimercaptide curve A and the bis(3,5-diisopropyl-4-hydroxy phenyl) phenyl methane curve B. Although curves A, B and C each contain equal amounts of anti-oxidation stabilizer, curve C represents a stabilizing effect which is more than the mere additive stability times of curves A and B.

The data necessary for plotting the curve set forth in FIGURE II is given the following table designated as Table II:

*Table II*

[Polymer: Hercules Pro-fax Polypropylene #6501]

| Percent A | Percent B | Induction time (hrs.) |
|---|---|---|
| 0.00 | 0.00 | 2.0 |
| 0.00 | 0.05 | 18.0 |
| 0.0025 | 0.0475 | 15.8 |
| 0.005 | 0.045 | 15.0 |
| 0.010 | 0.040 | 20.4 |
| 0.015 | 0.035 | 29.7 |
| 0.025 | 0.025 | 41.5 |
| 0.035 | 0.015 | 48.3 |
| 0.050 | 0.00 | 3.2 |

A represents cadmium dilauryl mercaptide.
B represents bis(3,5-diisopropyl-4-hydroxy phenyl) phenyl methane.

The curve set forth in FIGURE II, while drawn to a specific combination, is representative of those proportions which are acceptable for the two component synergistic anti-oxidation stabilizers of this invention.

Having thus disclosed my invention, what I claim is:

1. A composition comprising polypropylene and between about 0.05% to 0.5% by weight of said polypropylene of a two-component mixture consisting of cadmium dilauryl dimercaptide and bis(3,5-diisopropyl-4-hydroxy phenyl) phenyl methane, said mercaptide being present in the mixture at a weight ratio to said phenolic compound of about 0.2/1 to 45/1.

2. A composition comprising polypropylene and about 0.05% by weight of said polypropylene of a two-component mixture consisting of about 70 parts by weight cadmium dilauryl dimercaptide and about 30 parts by weight of bis(3,5-diisopropyl-4-hydroxy phenyl) phenyl methane.

(References on following page)

References Cited by the Examiner

UNITED STATES PATENTS

| | | | |
|---|---|---|---|
| 2,515,906 | 7/50 | Stevens et al. | 260—45.95 |
| 2,542,972 | 2/51 | Thompson | 260—45.95 |
| 2,581,915 | 1/52 | Radcliffe | 260—45.75 |
| 2,807,653 | 9/57 | Filbey | 260—395 |
| 2,894,004 | 7/59 | Dietzler | 260—45.95 |
| 2,972,597 | 2/61 | Newland et al. | 260—45.85 |
| 2,985,617 | 5/61 | Salyer et al. | 260—45.95 |

LEON J. BERCOVITZ, *Primary Examiner.*

A. M. BOLTTCHER, A. D. SULLIVAN, *Examiners.*